(12) United States Patent
Dudar et al.

(10) Patent No.: US 10,302,031 B2
(45) Date of Patent: May 28, 2019

(54) SYSTEMS AND METHODS FOR MANAGING PURGE PATHWAY PRESSURE IN TURBOCHARGED ENGINES

(71) Applicant: Ford Global Technologies, LLC, Dearborn, MI (US)

(72) Inventors: Aed M. Dudar, Canton, MI (US); Kevin William Plymale, Canton, MI (US); Charlie P. Threadingham, Westland, MI (US); David Martin, Dearborn, MI (US); Terry Vandenbrink, Carleton, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 15/415,575

(22) Filed: Jan. 25, 2017

(65) Prior Publication Data
US 2018/0209359 A1    Jul. 26, 2018

(51) Int. Cl.
*F02D 41/00* (2006.01)
*F02M 25/08* (2006.01)

(52) U.S. Cl.
CPC ....... *F02D 41/004* (2013.01); *F02D 41/0007* (2013.01); *F02D 41/0032* (2013.01); *F02M 25/0836* (2013.01); *Y02T 10/144* (2013.01)

(58) Field of Classification Search
CPC . Y02T 10/144; F02D 41/003–41/0045; F02M 25/08–25/0836; F02B 37/00–37/24
See application file for complete search history.

(56) References Cited

U.S. PATENT DOCUMENTS

| | | |
|---|---|---|
| 9,109,550 B2 | 8/2015 | Kempf et al. |
| 2010/0224171 A1* | 9/2010 | Peters ................ F02M 25/0836 123/520 |
| 2013/0263590 A1 | 10/2013 | Kempf et al. |
| 2016/0201613 A1* | 7/2016 | Ulrey .................. F02D 41/0007 123/520 |
| 2016/0290285 A1* | 10/2016 | Dudar .................. F02M 25/089 |

* cited by examiner

*Primary Examiner* — Laert Dounis
(74) *Attorney, Agent, or Firm* — Julia Voutyras; McCoy Russell LLP

(57) ABSTRACT

Methods and systems are provided for operating an evaporative emissions system in a turbocharged engine. In one example, a method may include pulsing open a canister purge valve responsive to the turbocharged engine entering a boosted mode of operation. The canister purge valve may be opened for a duration long enough to close a check valve coupled between the canister purge valve and an intake of the engine.

17 Claims, 4 Drawing Sheets

SYSTEMS AND METHODS FOR MANAGING PURGE PATHWAY PRESSURE IN TURBOCHARGED ENGINES

FIELD

The present description relates generally to methods and systems for controlling a turbocharged vehicle engine to adaptively control purge pathway air flow.

BACKGROUND/SUMMARY

Vehicle emission control systems may be configured to store fuel vapors from fuel tank refueling and diurnal engine operations in a fuel vapor canister, and then purge the stored vapors during a subsequent engine operation. The stored vapors may be routed to engine intake for combustion, further improving fuel economy. In a typical canister purge operation, a canister purge valve coupled between the engine intake and the fuel canister is opened, allowing for intake manifold vacuum to be applied to the fuel canister.

Turbocharged and supercharged engines periodically operate with a positive intake manifold pressure. In such scenarios, the canister purge valve must remain closed in order to prevent boost pressure from reaching the fuel vapor canister and desorbing fuel vapor to atmosphere. To prevent boost pressure from forcing open the canister purge valve, a check valve may be disposed between the canister purge valve and the engine intake.

However, during the transition between normal (intake vacuum) engine operating conditions and boosted engine operating conditions, there is a slight lag prior to the check valve closing. As such, the canister purge valve experiences a brief burst of pressure. Over repeated engine transitions, this may cause excessive wear on the canister purge valve membrane, causing the valve to fail prematurely.

Other attempts to address pressurization of the purge passage include dual path-purge systems where a second check valve is coupled to an ejector leading to a passage upstream of an intake air compressor. One example approach is shown by Kempf et al. in U.S. Pat. No. 9,109,550. Therein, during non-boosted conditions, the canister is purged through an open canister purge valve via a first check valve, and during boosted conditions, the canister is purged through an open canister via a second check valve. The additional conduits and check valve allow for dissipation of boost pressure that breaches the first check valve.

However, the inventors herein have recognized potential issues with such systems. As one example, the additional valve, ejectors, conduits, connectors, mounts, etc. add significant manufacturing costs, and require additional testing for undesired emissions and functionality. For engines such as Gasoline Turbocharged Direct Injection (GTDI) engines, the engine operates in non-boosted conditions frequently enough to purge the fuel canister through a single-path purge system that does need the additional purge time during boosted conditions to meet emissions standards. As such, the added expense is unnecessary.

In one example, the issues described above may be addressed by a method for a turbocharged engine, comprising: receiving an indication that the turbocharged engine has transitioned to a boosted mode of operation, and opening a canister purge valve for a pressure relief duration. In this way, pressure from the engine intake is flowed past the canister purge valve, preventing unnecessary wear of the canister purge valve.

As one example, the canister purge valve may be opened until a check valve coupled within a conduit between the canister purge valve and the engine intake closes. The increased airflow through the check valve enables the valve to close faster than if the canister purge valve were closed, thereby developing an upstream backpressure. The method allows for the incorporation of a single check valve within a single-path purge system for a turbocharged engine. In this way, both manufacturing and warranty costs are reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
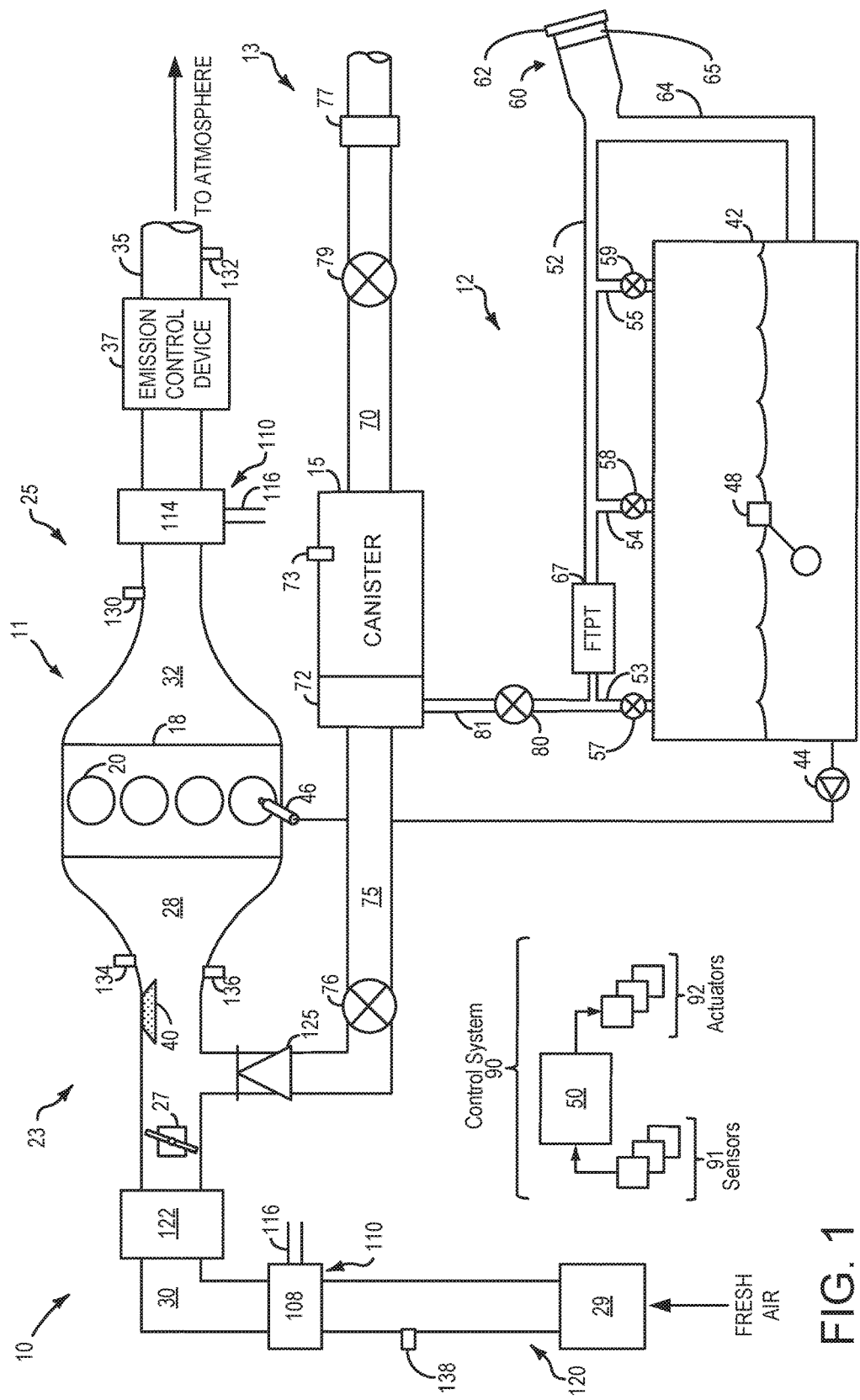
FIG. 1 schematically shows an example vehicle system comprising an engine system coupled to a fuel system and an evaporative emissions system.
Figure 2:
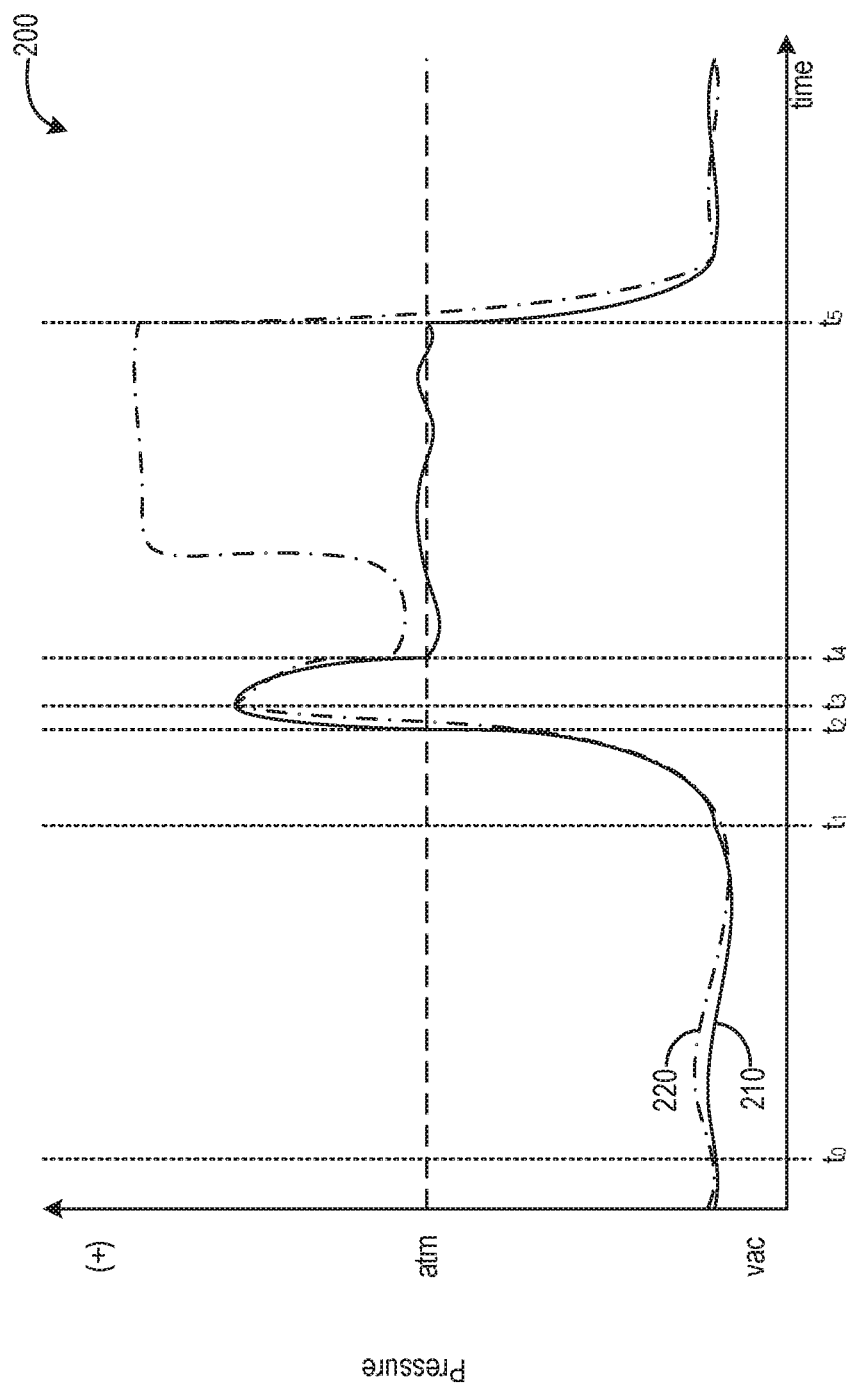
FIG. 2 shows an example plot indicating pressure over time within a canister purge conduit.
Figure 3:
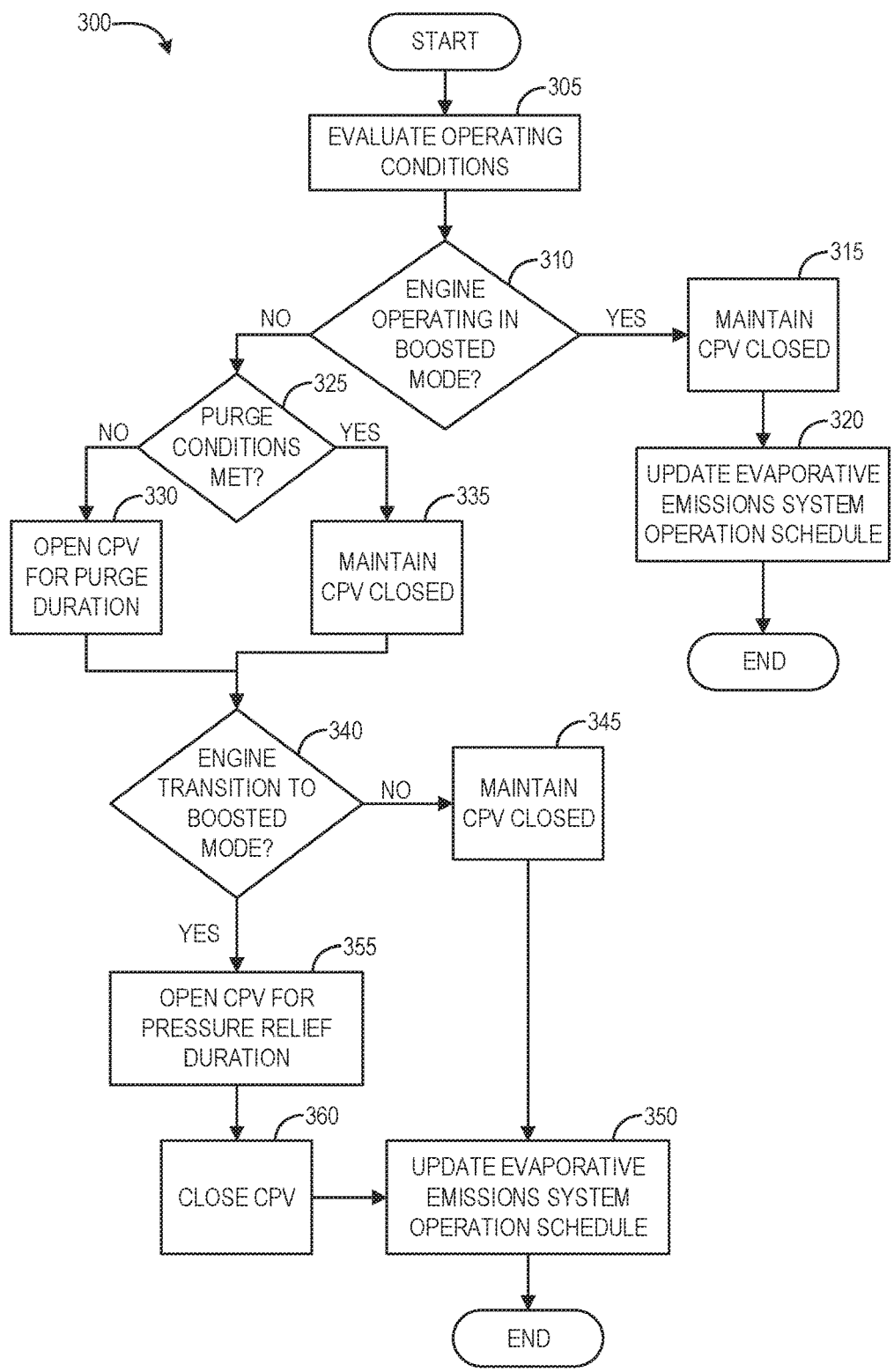
FIG. 3 shows a flow-chart for a high level example method for operating a canister purge valve in a turbocharged engine.
Figure 4:
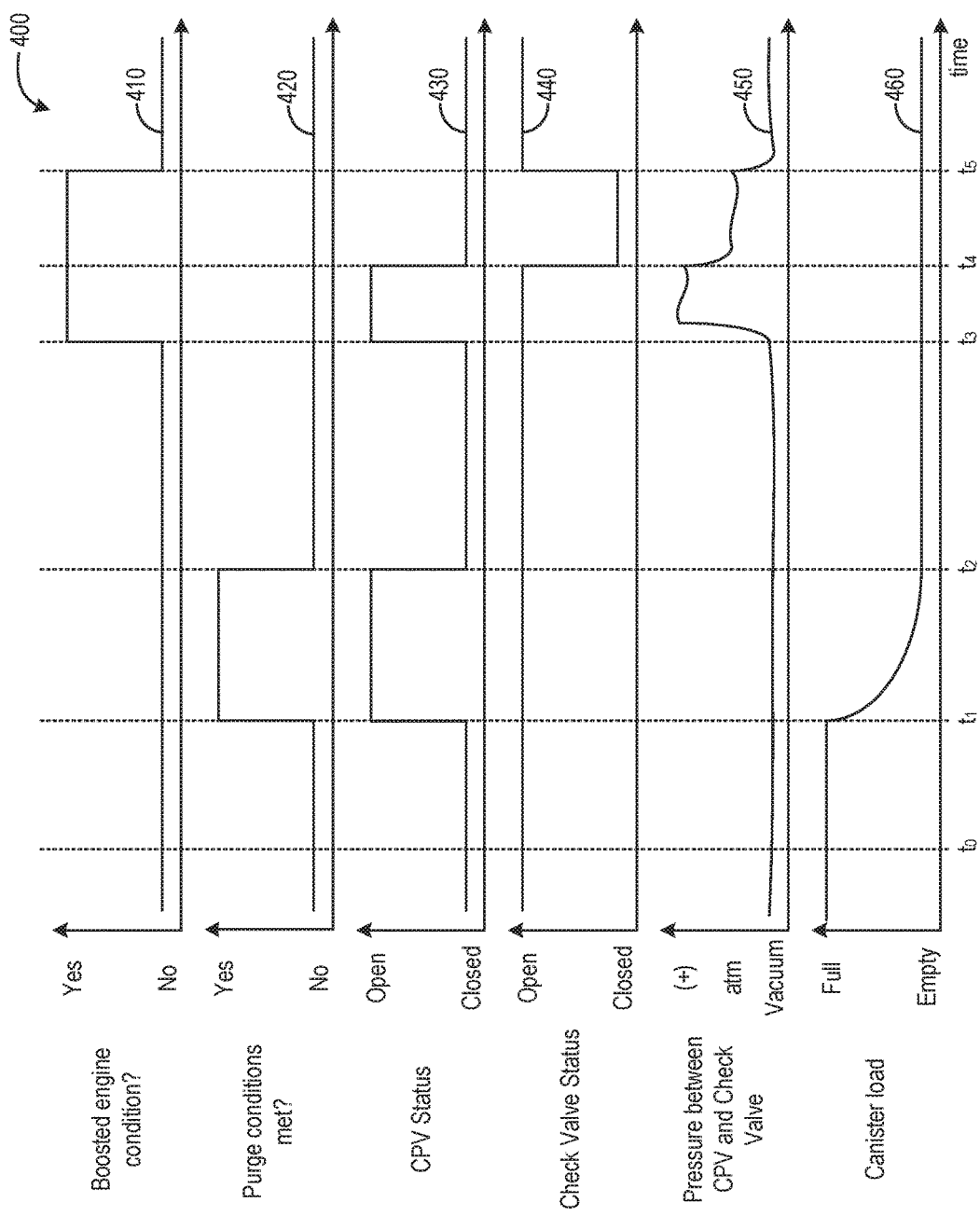
FIG. 4 shows an example timeline for operating an evaporative emissions system in accordance with the method of FIG. 3.

The following description relates to systems and methods for operating an evaporative emissions system in a turbocharged vehicle. An example turbocharged vehicle system is shown in FIG. 1. In such a vehicle, preventative measures must be taken to ensure that the canister purge valve is not forced open by intake air pressure during boosted conditions. As shown in FIG. 1, this may be accomplished by disposing a check valve within the canister purge pathway, between the canister purge valve and the engine intake. However, as shown in FIG. 2, there is a lag between the pressurizing of the engine intake and the closing of the check valve, forcing air into the canister purge pathway. This may result in additional wear and premature degradation of the canister purge valve. A method to mitigate wear on the canister purge valve is shown in FIG. 3, wherein the canister purge valve is pulsed open at the outset of a boosted engine condition. An example timeline for operation of an evaporative emissions system coupled to a turbocharged engine via a single-path purge configuration is shown in FIG. 4.

FIG. 1 shows a schematic depiction of a vehicle system 10. The vehicle system 10 includes an engine system 11 coupled to a fuel system 12 and to an emissions control system 13. Emission control system 13 includes a fuel vapor container or canister 15 which may be used to capture and store fuel vapors. In some examples, vehicle system 10 may be a hybrid electric vehicle system comprising a hybrid vehicle propulsion system.

The engine system 11 may include an engine 18 having a plurality of cylinders 20. Engine 18 includes an engine intake 23 and an engine exhaust 25. Engine intake 23 includes a throttle 27 fluidly coupled to the engine intake manifold 28 via an intake passage 30. An air filter 29 is positioned upstream of throttle 27 in intake passage 30. The engine exhaust 25 includes an exhaust manifold 32 leading to an exhaust passage 35 that routes exhaust gas to the atmosphere. The engine exhaust 25 may include one or more emission control devices 37, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 40 may be placed in the intake manifold of engine 18 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 40. In addition, fuel vapors stored during an engine shutdown can also be desorbed from the AIS HC during engine operation. In this way, AIS HC 40 may be continually loaded and purged, and the trap may reduce evaporative emissions from the intake passage even when engine 18 is shut down.

Fuel system 12 may include a fuel tank 42 coupled to a fuel pump system 44. The fuel pump system 44 may include one or more pumps for pressurizing fuel delivered to the injectors of engine 18, such as the example injector 46 shown. While only a single injector 46 is shown, additional injectors are provided for each cylinder. It will be appreciated that fuel system 12 may be a return-less fuel system, a return fuel system, or various other types of fuel system. Fuel tank 42 may hold a plurality of fuel blends, including fuel with a range of alcohol concentrations, such as various gasoline-ethanol blends, including E10, E85, gasoline, etc., and combinations thereof. A fuel level sensor 48 located in fuel tank 42 may provide an indication of the fuel level ("Fuel Level Input") to a controller 50. As depicted, fuel level sensor 48 may comprise a float connected to a variable resistor. Alternatively, other types of fuel level sensors may be used.

Vapors generated in fuel system 18 may be routed to an evaporative emissions control system 13 which includes a fuel vapor canister 15 via vapor recovery line 52, before being purged to the engine intake 23. Vapor recovery line 52 may be coupled to fuel tank 42 via one or more conduits and may include one or more valves for isolating the fuel tank during certain conditions. For example, vapor recovery line 52 may be coupled to fuel tank 42 via one or more or a combination of conduits 53, 54, and 55.

Further, in some examples, one or more fuel tank vent valves may be deposed in conduits 53, 54, and/or 55. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 53 may include a grade vent valve (GVV) 57, conduit 54 may include a fill limit venting valve (FLVV) 58, and conduit 55 may include a grade vent valve (GVV) 59. Further, in some examples, recovery line 52 may be coupled to a fuel filler system 60. In some examples, fuel filler system 60 may include a fuel cap 62 for sealing off the fuel filler system from the atmosphere. Fuel filler system 60 may be coupled to fuel tank 42 via a fuel filler pipe or neck 64.

Further, fuel filler system 60 may include refueling lock 65. In some embodiments, refueling lock 65 may be a fuel cap locking mechanism. The fuel cap locking mechanism may be configured to automatically lock the fuel cap in a closed position so that the fuel cap cannot be opened. For example, the fuel cap 62 may remain locked via refueling lock 65 while pressure or vacuum in the fuel tank is greater than a threshold. In some embodiments, such a fuel tank pressure or vacuum may be determined by a fuel tank pressure sensor, such as fuel tank pressure transducer 67. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 65 may be a filler pipe valve located at a mouth of fuel filler pipe 64. In such embodiments, refueling lock 65 may not prevent the removal of fuel cap 62. Rather, refueling lock 65 may prevent the insertion of a refueling pump into fuel filler pipe 64. The filler pipe valve may be electrically locked, for example by a solenoid, or mechanically locked, for example by a pressure diaphragm. In some embodiments, refueling lock 65 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 65 is locked using an electrical mechanism, refueling lock 65 may be unlocked by commands from controller 50, for example, when a fuel tank pressure decreases below a pressure threshold. In embodiments where refueling lock 65 is locked using a mechanical mechanism, refueling lock 65 may be unlocked via a pressure gradient, for example, when a fuel tank pressure decreases to atmospheric pressure.

Emissions control system 13 may include one or more emissions control devices, such as one or more fuel vapor canisters 15 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 13 may further include a canister ventilation path or vent line 70 which may route gases out of the canister 15 to the atmosphere when storing, or trapping, fuel vapors from fuel system 12.

Canister 15 may include a buffer 72 (or buffer region), each of the canister and the buffer comprising the adsorbent. As shown, the volume of buffer 72 may be smaller than (e.g., a fraction of) the volume of canister 15. The adsorbent in the buffer 72 may be same as, or different from, the adsorbent in the canister (e.g., both may include charcoal). Buffer 72 may be positioned within canister 15 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 73 may be coupled to and/or within canister 15. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 70 may also allow fresh air to be drawn into canister 15 when purging stored fuel vapors from fuel system 12 to engine intake 23 via purge line 75 and purge valve 76. For example, purge valve 76 may be normally closed but may be opened during certain conditions so that vacuum from engine intake manifold 28 is provided to the fuel vapor canister for purging. In some examples, vent line 70 may include an air filter 77 disposed therein upstream of a canister 15.

In some examples, the flow of air and vapors between canister 15 and the atmosphere may be regulated by a canister vent valve 79 coupled within vent line 70. When included, canister vent valve 79 may be a normally open valve, so that fuel tank isolation valve 80 (FTIV) may control venting of fuel tank 42 with the atmosphere. FTIV 80 may be positioned between the fuel tank and the fuel vapor canister within conduit 81. FTIV 80 may be a normally closed valve, that when opened, allows for the venting of fuel vapors from fuel tank 42 to canister 15. Fuel vapors may then be vented to atmosphere, or purged to engine intake 23 via canister purge valve 76.

Fuel system 12 may be operated by controller 50 in a plurality of modes by selective adjustment of the various valves and solenoids. For example, the fuel system may be operated in a fuel vapor storage mode (e.g., during a fuel tank refueling operation and with the engine not running), wherein the controller 50 may open isolation valve 80 while closing canister purge valve (CPV) 76 to direct refueling vapors into canister 15 while preventing fuel vapors from being directed into the intake manifold.

As another example, the fuel system may be operated in a refueling mode (e.g., when fuel tank refueling is requested by a vehicle operator), wherein the controller 50 may open isolation valve 80, while maintaining canister purge valve 76 closed, to depressurize the fuel tank before allowing enabling fuel to be added therein. As such, isolation valve 80 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 50 may open canister purge valve 76 while closing isolation valve 80. Herein, the vacuum generated by the intake manifold of the operating engine may be used to draw fresh air through vent line 70 and through fuel vapor canister 15 to purge the stored fuel vapors into intake manifold 28. In this mode, the purged fuel vapors from the canister are combusted in the engine. The purging may be continued until the stored fuel vapor amount in the canister is below a threshold.

Controller 50 may comprise a portion of a control system 90. Control system 90 is shown receiving information from a plurality of sensors 91 (various examples of which are described herein) and sending control signals to a plurality of actuators 92 (various examples of which are described herein). As one example, sensors 91 may include exhaust gas oxygen sensor 130 located upstream of the emission control device, exhaust temperature sensor 132, manifold air pressure (MAP) sensor 134, mass air flow sensor 136 (MAF), and intake air temperature sensor 138. Other sensors such as pressure, temperature, air/fuel ratio, and composition sensors may be coupled to various locations in the vehicle system 10. As another example, actuators 92 may include intake throttle 27, fuel tank isolation valve 80, canister purge valve 76, and canister vent valve 79. The control system 90 may include controller 50. The controller may receive input data from the various sensors, process the input data, and trigger the actuators in response to the processed input data based on instruction or code programmed therein corresponding to one or more routines. For example, control system 90 may receive input data from MAP sensor 134 and MAF sensor 136, process the received data, and actuate one or more of CPV 76, CVV 79, FTIV 80, and fuel pump system 44. Example control routines are described herein with regard to FIG. 3.

In some examples, controller 50 may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 50 on fuel system 12 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. CVV 79 may function to adjust a flow of air and vapors between canister 15 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 79 may be a solenoid valve wherein opening or closing of the valve is performed via actuation of a canister vent solenoid. In particular, the canister vent valve may be closed upon actuation of the canister vent solenoid. In some examples, CVV 79 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Throttle 27 may be located in intake passage 30 downstream of a compressor 108 of a boosting device, such as turbocharger 110, or a supercharger. Compressor 108 of turbocharger 110 may be arranged between air filter 29 and throttle 27 in intake passage 30. Compressor 108 may be at least partially powered by exhaust turbine 114, arranged between exhaust manifold 32 and emission control device 37 in exhaust passage 35. Compressor 108 may be coupled to exhaust turbine 114 via shaft 116. Compressor 108 may be configured to draw in intake air at atmospheric air pressure into an air induction system (AIS) 120 and boost it to a higher pressure. Using the boosted intake air, a boosted engine operation may be performed. After being compressed by compressor 108, the pressurized gasses flow through charge air cooler 122, for delivery to intake manifold 28 via throttle 27.

An amount of boost may be controlled, at least in part, by controlling an amount of exhaust gas directed through exhaust turbine 114. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 108. Controller 50 may adjust an amount of intake air that is drawn through compressor 108 by adjusting the position of a compressor bypass valve (not shown). In one example, when a larger amount of boost is requested, a smaller amount of intake air may be directed through the compressor bypass passage.

Emissions control system 13 may be configured as a single path purge system, as shown in FIG. 1. A check valve 125 may be deposed within purge line 75 between CPV 76 and intake manifold 28. During non-boosted engine operation, intake vacuum opens check valve 125. Under such conditions, opening CPV 76 with CVV 79 open will thus cause atmospheric air to be drawn through fuel vapor canister 15, desorbing fuel vapor that is then ported through CPV 76 and check valve 125 into engine intake for combustion. During boosted conditions, positive intake pressure forces check valve 125 closed. This prevents CPV 76 from being subject to pressure that may force the CPV open, thus reducing the risk of pressurized air reaching fuel vapor canister 15, which in turn could result in desorption of fuel vapor to atmosphere via vent line 70.

In addition to preventing fuel vapor desorption during boost conditions, check valve 125 protects CPV 76 itself from large boost pressures. However, in practice, when the CPV is closed at the time of transition from non-boosted engine conditions to boosted engine conditions, there is a short delay prior to the timing of the check valve closing. During this delay period, the CPV may experience a large pressure pulsation prior to the pulse dissipating and the check valve closing. This pulsation may create a load on the CPV membrane which causes fatigue and may result in the CPV membrane tearing.

As an example, FIG. 2 shows an example timeline 200 indicating pressure within a purge line over time at the transition between non-boosted and boosted engine conditions. Timeline 200 includes plot 210, indicating pressure between the check valve and the CPV over time. Timeline 200 further includes plot 220, indicating pressure between the check valve and the intake manifold over time. The CPV may be assumed to be closed for the duration of timeline 200.

At time $t_0$, the engine is operating under non-boosted conditions. As such, a vacuum exists between the CPV and the check valve, as shown by plot 210. Further, a vacuum exists between the check valve and the intake manifold, as shown by plot 220. At time $t_1$, the engine switches to operating in boosted mode. Pressure at the intake side of the check valve increases as boost pressure enters the intake manifold, and pressure at the CPV increases while the check valve remains open. At time $t_2$, pressure on both sides of the check valve reaches atmospheric pressure, but additional airflow through the check valve is required in order to close the check valve. Accordingly, pressure continues to rise, both between the CPV and the check valve and between the check valve and the intake manifold, until time $t_3$, when the check valve closes. Accumulated pressure between the CPV and the check valve dissipates from time $t_3$ to time $t_4$, and pressure in this compartment settles at or near atmospheric pressure. Pressure drops briefly between the check valve and the intake manifold upon the closing of the check valve at time $t_3$, then reaches a steady-state at the boost pressure. At time $t_5$, the engine switches from boosted to non-boosted conditions. As intake vacuum accumulates, the check valve is re-opened, and a vacuum develops both between the intake manifold and the check valve, and between the check valve and the CPV.

The inventors herein have recognized that one reason for this pressure spike at the transition from non-boosted to boosted conditions is that the check valve requires a certain volume of airflow there through in order to close. The volume of the purge line between the check valve and the CPV is relatively small, and thus pressure between the two valves must increase if the CPV is closed in order to realize the required volume of airflow through the check valve. As purge functionality requires the CPV to be located relatively close to the engine compartment, increasing the distance between the two valves may not be a practical solution.

FIG. 3 shows a flow chart for a high level example method 300 for adjusting airflow through a canister purge line during a transition between a non-boosted engine condition and a boosted engine condition. Instructions for carrying out method 300 and the rest of the methods included herein may be executed by a controller based on instructions stored on a non-transitory memory of the controller and in conjunction with signals received from sensors of the engine system, such as the sensors described above with reference to FIG. 1. The controller may employ engine actuators of the engine system to adjust engine operation, according to the methods described below.

At 305, method 300 includes evaluating operating conditions. Operating conditions may be measured, estimated or inferred. Operating conditions may include various vehicle conditions, such as vehicle speed, vehicle location, etc., various engine conditions, such as engine speed, engine load, engine status, etc., various fuel system conditions, such as fuel level, fuel tank pressure, canister load, etc., various ambient conditions, such as ambient temperature, humidity, barometric pressure, etc., and other relevant operating conditions.

Continuing at 310, method 300 includes determining whether the engine is operating in a boosted mode. For example, determining whether the engine is operating in a boosted mode may include determining whether an intake air compressor is currently operating. Additionally or alternatively, determining whether the engine is operating in a boosted mode may include determining whether an exhaust turbine is currently operating. In some examples, determining whether an exhaust turbine is currently operating may include determining whether exhaust is currently being directed to an exhaust turbine inlet, for example, by determining whether an exhaust inlet valve is currently commanded to an open position. Additionally or alternatively, determining whether the engine is operating in a boosted mode may include determining a pressure at the engine intake. For example, a controller may receive signals from a manifold adjusted pressure sensor indicating a current intake pressure. The boosted or non-boosted status of the engine may thus be inferred based on the indicated pressure, e.g., an intake pressure above atmospheric pressure may be indicative of a boosted engine condition, and an intake pressure below atmospheric pressure may be indicative of a non-boosted engine condition.

If it is determined that the engine is operating in a boosted mode, method 300 proceeds to 315. At 315, method 300 includes maintaining the canister purge valve closed. Maintaining the canister purge valve closed may include continuing to send a command from the controller to a CPV solenoid to maintain the CPV in a closed position, if the CPV solenoid is a default-open solenoid. If the CPV solenoid is a default-closed solenoid, or a latchable solenoid, maintaining the CPV in a closed position may include continuing to not send a command from the controller to the CPV solenoid. In some examples, additional signals or commands received by the controller indicating to open the CPV may be ignored or overridden for the duration of the boosted engine condition. Continuing at 320, method 300 includes updating the evaporative emissions operations schedule. For example canister purge operations may be delayed and/or rescheduled based on the boosted engine condition. Other operations requiring an open CPV, such as undesired emissions tests that require application of an engine intake vacuum to the evaporative emissions system may also be delayed and/or rescheduled based on the boosted engine condition.

Returning to 310, if it is determined that the engine is operating in a non-boosted mode, method 300 proceeds to 325. At 325, method 300 includes determining whether canister purge conditions are met. Determining whether canister purge conditions are met may include determining whether a canister load is above a threshold, whether a threshold duration has elapsed since a prior canister purge operation, whether an intake vacuum is above a threshold, whether engine speed and engine load conditions are compatible with canister purge operations, etc. For example, a controller may receive signals from various engine sensors and/or retrieve data stored in memory and/or lookup tables to determine whether the current engine operating conditions are indicative of conditions where a canister purge operation may be performed. If canister purge conditions are not met, method 300 proceeds to 335, and includes maintaining the canister purge valve closed.

If canister purge conditions are met, method 300 proceeds to 330 and includes opening the CPV for a purge duration. For example, the controller may issue a command to the CPV solenoid to adjust the position of the CPV from a closed position to an open position, thereby coupling the engine intake to the fuel vapor canister, and purging the contents of the fuel vapor canister to the engine intake. The duty cycle of the CPV may be held constant over the purge event, or may be varied. For example, the duty cycle of the CPV may be ramped up gradually, as the purge gas concentration is learned and updated. The purge duration may be predetermined and/or based on current operating conditions. For example, the CPV may be maintained in an open conformation until the purge gas concentration decreases below a threshold, or the canister load is otherwise determined to be below a threshold. The purge duration may be based at least in part in a current intake vacuum level. For example, the purge duration may be inversely proportionate to the current intake vacuum level, as increased intake vacuum may increase purge airflow through the canister, and thus a reduced duration may be needed to purge the contents of the fuel vapor canister. Following the purge duration, the CPV may be returned to a closed conformation.

Continuing at 340, method 300 includes determining whether the engine has transitioned to a boosted mode. As described with regard to 310, determining whether the engine is operating in a boosted mode may include one or more of determining whether an intake air compressor is currently operating, determining whether an exhaust turbine is currently operating, and determining a pressure at the engine intake. If the engine has not transitioned to a boosted mode, method 300 proceeds to 345 and includes maintaining the CPV closed. Continuing at 350, method 300 includes updating the evaporative emissions system operations schedule. Method 300 may then end.

If the engine has transitioned to a boosted mode, method 300 proceeds to 355. At 355, method 300 includes opening the CPV for a pressure relief duration. The pressure relief duration may be predetermined and/or based on current operating conditions. For example, the pressure relief duration may be a sufficient period of time to allow the check valve (coupled between the CPV and intake) to close. The pressure relief duration may include a period of opening the CPV until air flow between the check valve and CPV is reduced to 0 and/or the pressure between the check valve and CPV settles at atmospheric pressure. The pressure relief duration may not be based on a canister load, and may further not be based on whether purging conditions are met. In other words, the pressure relief duration may be determined independently of factors that contribute to determining the purge duration, as discussed with regard to 335. In some scenarios, the pressure relief duration may be shorter than the purge duration, for example, during conditions wherein the canister is full, and/or the canister load is above a threshold.

By opening the canister purge valve for a pressure relief duration in this manner, the length of time between the transition to boost mode and the closing of the check valve may be reduced. Opening the CPV for a pressure relief duration may increase the volume of the purge line downstream of the check valve. Further, opening the CPV for a pressure relief duration may increase the rate of airflow through the check valve prior to the check valve closing.

Continuing at 360, method 300 includes closing the CPV following the pressure relief duration. Method 300 then proceeds to 350 and includes updating the evaporative emissions system operations schedule. Method 300 then ends.

Turning to FIG. 4, an example timeline 400 is shown for operating a turbocharged engine in accordance with the method of FIG. 3. The turbocharged engine includes an evaporative emissions system featuring a single-path purge system wherein a check valve is disposed between a canister purge valve and an engine intake, as depicted in FIG. 1 for example. Timeline 400 includes plot 410, indicating whether the turbocharged engine is operating in a boosted condition over time, and plot 420, indicating whether canister purge conditions are met over time. Timeline 400 further includes plot 430, indicating the status of the canister purge valve over time, and plot 440, indicating the status of the check valve over time. Timeline 400 further includes plot 450, indicating a pressure between the canister purge valve and check valve over time, and plot 460, indicating a canister load over time.

At time $t_0$, the engine is not operating under boosted conditions, as indicated by plot 410, and canister purge conditions are not met, as indicated by plot 420. As such, the canister purge valve is closed, as indicated by plot 430, and the check valve is open, as indicated by plot 440. With the engine operating under normal conditions, the engine intake holds a vacuum, which is applied across the open check valve. Accordingly, there is a vacuum between the check valve and the CPV, as indicated by plot 450.

At time $t_1$, canister purge conditions are met. As such, the CPV is opened to purge the contents of the fuel vapor canister to the engine intake. The canister load decreases from time $t_1$ to time $t_2$, as indicated by plot 460. At time $t_2$, the CPV is closed. As the canister is empty, canister purge conditions are no longer met.

At time $t_3$, the engine switches to a boosted condition, as indicated by plot 410. Accordingly the CPV is opened for a pressure relief duration from time $t_3$ to time $t_4$. The pressure between the CPV and the check valve increases initially at time $t_3$, as the intake air pressure passes through the check valve. At time $t_4$, the check valve closes. Accordingly the CPV is closed, and the pressure between the CPV and the check valve settles near atmospheric pressure. At time $t_5$, the engine switches to a non-boosted condition. Accordingly, the check valve opens under the intake vacuum, and a vacuum develops between the CPV and the check valve.

As one embodiment, a method for a turbocharged engine is presented, comprising: receiving an indication that the turbocharged engine has transitioned to a boosted mode of operation; and opening a canister purge valve for a pressure relief duration. In such an embodiment, or any other embodiment, the pressure relief duration may additionally or alternatively be based on a duration to close a check valve coupled between the canister purge valve and an intake of the turbocharged engine. In any of the preceding embodiments, or any other embodiment, opening the canister purge valve may additionally or alternatively divert airflow from the engine intake through the canister purge valve towards a purge port of a fuel vapor canister. In any of the preceding embodiments, or any other embodiment, the method may additionally or alternatively comprise receiving an indication that the turbocharged engine has transitioned to a non-boosted mode of operation; and maintaining the canister purge valve closed. In any of the preceding embodiments, or any other embodiment, the method may additionally or alternatively comprise maintaining a canister vent valve open for the pressure relief duration. In any of the preceding embodiments, or any other embodiment, the pressure relief duration may additionally or alternatively not be based on a fuel vapor canister load.

In another embodiment, a method for a turbocharged engine is presented, comprising: during a first condition, including an intake manifold pressure below a threshold, opening a canister purge valve for a purge duration; and during a second condition, including an intake manifold pressure above the threshold, opening a canister purge valve for a pressure relief duration. In such an embodiment, or any other embodiment, the pressure relief duration may additionally or alternatively not be based on a fuel vapor canister load. In any of the preceding embodiments, or any other embodiment, the pressure relief duration may additionally or alternatively be shorter than the purge duration. In any of the preceding embodiments, or any other embodiment, the threshold may additionally or alternatively be atmospheric pressure. In any of the preceding embodiments, or any other embodiment, the first condition may additionally or alternatively include a non-boosted engine condition, and the second condition may additionally or alternatively include a boosted engine condition. In any of the preceding embodiments, or any other embodiment, the pressure relief duration may additionally or alternatively be based on a duration to close a check valve coupled between the canister purge valve and an intake manifold.

In yet another embodiment, a system for a turbocharged engine is presented, comprising: a fuel vapor canister coupled to atmosphere via a canister vent line and coupled to an engine intake via a canister purge line; an exhaust turbine coupled to a charge air compressor, the charge air compressor disposed within the engine intake upstream of a canister purge line outlet; a canister purge valve disposed within the canister purge line between the fuel vapor canister and the canister purge line outlet; a check valve disposed within the canister purge line between the canister purge valve and the canister purge line outlet; and a controller configured with instructions stored in non-transitory memory, that when executed, cause the controller to: receive an indication that the charge air compressor has been activated; and open the canister purge valve for a pressure relief duration. In such an embodiment, or any other embodiment, the pressure relief duration may additionally or alternatively be based on a duration to close the check valve. In any of the preceding embodiments, or any other embodiment, the pressure relief duration may additionally or alternatively be based on an airflow between the check valve and the canister purge valve decreasing below a threshold. In any of the preceding embodiments, or any other embodiment, the controller may additionally or alternatively be further configured with instructions stored in non-transitory memory, that when executed, cause the controller to: receive an indication that the charge air compressor has not been activated and that a fuel vapor canister load is below a threshold; and maintain the canister purge valve closed. In any of the preceding embodiments, or any other embodiment, the controller may additionally or alternatively be further configured with instructions stored in non-transitory memory, that when executed, cause the controller to: receive an indication that the charge air compressor has not been activated and that a fuel vapor canister load is above a threshold; and open the canister purge valve for a purge duration, greater than the pressure relief duration. In any of the preceding embodiments, or any other embodiment, the canister purge line may additionally or alternatively not be coupled to the engine intake upstream of the charge air compressor. In any of the preceding embodiments, or any other embodiment, the canister purge line may additionally or alternatively not be coupled to an ejector. In any of the preceding embodiments, or any other embodiment, the controller may additionally or alternatively be further configured with instructions stored in non-transitory memory, that when executed, cause the controller to: purge the fuel vapor canister only during conditions wherein the charge air compressor is inactive.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine, comprising:
   receiving an indication that the turbocharged engine has transitioned to a boosted mode of operation; and
   opening a canister purge valve for a pressure relief duration,
   wherein the pressure relief duration is based on a duration to close a check valve coupled between the canister purge valve and an intake of the turbocharged engine, and wherein the pressure relief duration is greater than a non-zero threshold number of units of time.

2. The method of claim 1, wherein opening the canister purge valve diverts airflow from the engine intake through the canister purge valve towards a purge port of a fuel vapor canister.

3. The method of claim 1, further comprising:
   receiving an indication that the turbocharged engine has transitioned to a non-boosted mode of operation; and
   maintaining the canister purge valve closed.

4. The method of claim 1, further comprising:
   maintaining a canister vent valve open for the pressure relief duration.

5. The method of claim 1, wherein the pressure relief duration is not based on a fuel vapor canister load, and wherein the indication is based on a manifold pressure transitioning from below atmospheric pressure to above atmospheric pressure.

6. A method for a turbocharged engine, comprising:
   during a first condition, including an intake manifold pressure below a threshold, opening a canister purge valve for a purge duration; and
   during a second condition, including an intake manifold pressure above the threshold, opening the canister purge valve for a pressure relief duration, the pressure relief duration based on a duration to close a check valve coupled between the canister purge valve and an intake manifold.

7. The method of claim 6, wherein the pressure relief duration is not based on a fuel vapor canister load, wherein the first condition is different from and mutually exclusive of the second condition.

8. The method of claim 6, wherein the pressure relief duration is shorter than the purge duration.

9. The method of claim 6, wherein the threshold is based on a determination of atmospheric pressure.

10. The method of claim 6, wherein the first condition includes a non-boosted engine condition, and wherein the second condition includes a boosted engine condition.

11. A system for a turbocharged engine, comprising:
    a fuel vapor canister coupled to atmosphere via a canister vent line and coupled to an engine intake via a canister purge line;
    an exhaust turbine coupled to a charge air compressor, the charge air compressor disposed within the engine intake upstream of a canister purge line outlet;
    a canister purge valve disposed within the canister purge line between the fuel vapor canister and the canister purge line outlet;
    a check valve disposed within the canister purge line between the canister purge valve and the canister purge line outlet; and
    a controller configured with instructions stored in non-transitory memory, that when executed, cause the controller to:
      receive an indication that the charge air compressor has been activated; and
      open the canister purge valve for a pressure relief duration, wherein the pressure relief duration is based on a duration to close the check valve.

12. The system of claim 11, wherein the pressure relief duration is based on an airflow between the check valve and the canister purge valve decreasing below a threshold.

13. The system of claim 11, wherein the controller is further configured with instructions stored in non-transitory memory, that when executed, cause the controller to:
    receive an indication that the charge air compressor has not been activated and that a fuel vapor canister load is below a threshold; and
    maintain the canister purge valve closed.

14. The system of claim 13, wherein the controller is further configured with instructions stored in non-transitory memory, that when executed, cause the controller to:
    receive an indication that the charge air compressor has not been activated and that a fuel vapor canister load is above the threshold; and
    open the canister purge valve for a purge duration, greater than the pressure relief duration.

15. The system of claim 11, wherein the canister purge line is not coupled to the engine intake upstream of the charge air compressor.

16. The system of claim 15, wherein the canister purge line is not coupled to an ejector.

17. The system of claim 16, wherein the controller is further configured with instructions stored in non-transitory memory, that when executed, cause the controller to:
purge the fuel vapor canister only during conditions wherein the charge air compressor is inactive.

* * * * *